Figure 1:
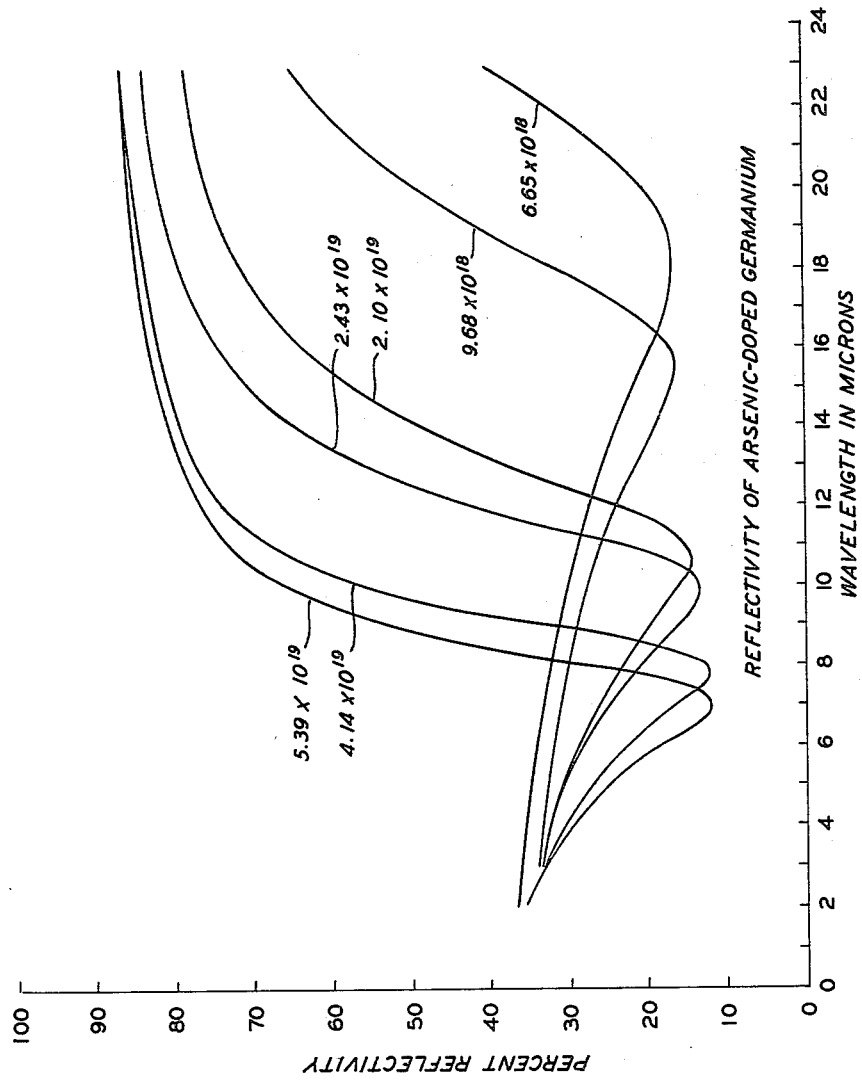

INVENTOR
W. G. SPITZER

United States Patent Office 3,109,932
Patented Nov. 5, 1963

3,109,932
MEASUREMENT OF IMPURITY CONCENTRATION IN SEMICONDUCTING MATERIAL
William G. Spitzer, Plainfield, N.J., assignor to Bell Telephone Laboratories, Incorporated, New York, N.Y., a corporation of New York
Filed Oct. 7, 1960, Ser. No. 61,288
2 Claims. (Cl. 250—83.3)

This invention relates to the fabrication of semiconductive devices and more particularly to the measurement of impurity concentration in semiconductive material for use in such fabrication.

In the fabrication of semiconductive devices, an early step typically is the preparation of a monocrystalline ingot of the semiconductor material, typically germanium or silicon, including a prescribed concentration of a particular conductivity-type determining impurity, all other impurities having been removed to a point of electrical insignificance. Typically, thereafter the ingot is cut into slices and individual slices are processed to introduce p-n junctions appropriately located. The slices are eventually diced further into individual wafers or elements for use in the semiconductive devices.

It is usual at an early stage of the fabrication, typically in the ingot stage, to determine the concentration of the conductivity-type determining impurity, henceforth to be called simply the impurity, in the semiconductor material to insure that it falls within the prescribed range because such concentration vitally affects the electrical characteristics and hence usefulness of the material. By such determination, there is ascertained the suitability of the material for a particular end use. Material of appropriate concentration is processed further for such intended use while material of concentration outside the prescribed range is either diverted to other end uses or processed further to achieve a concentration in a desired range.

At present, it is typically the practice for making such determination of the concentration of the impurity to cut out wafers from various portions of the ingot, grind the faces of such portions so that a uniform thickness is obtained, cut from such portions a shaped piece for use as a Hall bridge, solder leads to the piece, and make a careful determination of the Hall voltage in the complex apparatus required for accurate measurement of the magnitude of the Hall effect. From the Hall voltage the carrier concentration may be calculated. The complete operation may take as much as eight hours. In addition to being time consuming, this procedure suffers from the disadvantages of necessitating at least partial destruction of the original ingot and requiring elaborate special equipment. Also, the accuracy of the profile of impurity concentration along the ingot length is dependent upon the number of portions cut out of the ingot and it is necessary to interpolate between the measured points, with a resulting decrease in the precision of the method. However, the more points which are taken the greater the destruction of the ingot and the greater the loss of ingot material.

Moreover, as the impurity concentration increases above $10^{18}$ cm.$^{-3}$ the Hall measurements become more and more difficult to make and increasingly complex instrumentation is required to determine accurately the very small Hall voltages which are involved. For example, in germanium with an impurity concentration of $10^{19}$ cm.$^{-3}$, the Hall voltage is approximately one microvolt. Material with an impurity concentration of this magnitude is becoming more important with the increase in the importance of tunnel diodes, which utilize heavily-doped material.

Other methods of determining impurity concentration are even more difficult. That utilizing the Faraday effect for example, requires considerable special equipment and exceptionally thin wafers with each face optically polished.

Since in the present technology emphasis is being placed upon rapid production of semiconductive devices, it becomes more and more important to provide quick and easy methods of analysis for a production installation, where efficient use of facilities demands that the time lag between ingot preparation and ingot use be short and that maximum use of a semiconductor ingot be furthered.

An object, therefore, of this invention is a method suitable for production control by which the impurity concentration of semiconductive material and so its suitability for an intended use may be determined rapidly.

A further object is apparatus which will permit a determination of the profile of the carrier concentration of an ingot of semiconductor material directly without the destruction of any part of the ingot.

Another object is a method which obviates the need for extensive polishing or grinding of a sample of the semiconductor whose impurity concentration is to be determined.

Still another object is a procedure which will allow the carrier concentration in semiconductor material to be determined in concentration ranges in which a determination based upon prior known techniques of measurement is exceptionally difficult to make.

The method which I have discovered is based first on the observation that the reflectivity of a surface of a semiconductor to infrared radiation, particularly of between two and thirty microns wavelength, depends upon the concentration of electrical charge carriers in a narrow layer at the surface of the material. This dependence arises from the fact that the electric susceptibility and the dielectric constant are functions of the number of electrical charge carriers in the sample. Moreover, the number of electrical charge carriers is substantially equal to the number of impurity atoms, since typically operation is such that such atoms are all ionized and such ionized atoms provide the charge carriers.

In particular, I have found that the wave length of the incident radiation in the infrared region at which the reflectivity is a minimum is a direct measure of the carrier and hence impurity concentration in a layer at the surface of the semiconductor. Therefore, from a calibration curve prepared by measuring this minimum wave length for a number of known impurity concentrations, the impurity concentration of an unknown sample, in which the concentration in such layer is representative as is typically the case in a section normal to the growth axis of the crystal, may be determined by measuring the wave length at which reflectivity is a minimum. Such a measurement takes a matter of seconds once the calibration curve has been prepared. Accordingly, the profile of the impurity concentration even in an elongated ingot can be prepared in a matter of minutes.

Moreover, this procedure can be used with samples which are merely rough-ground to provide only a relatively smooth face. Rough polishing is suitable for the application of the method since only the position of the wave length minimum is desired and not the absolute value of the reflectivity. In addition, rough polishing is sufficient because of the longer wave length of the infrared radiation, which in effect sees a smoother surface than would radiation in the visible range, since the imperfections will be smaller relative to the wave length of the incident radiation.

My method has the additional advantage of being most accurate in the ranges of impurity concentration above about $10^{18}$ cm.$^{-3}$ for the semiconductors of primary device interest, for in this region the reflectivity minima are sharpest. This, too, is the region where Hall measurements are most difficult.

For production control purposes, it is ordinarily sufficient simply to determine that the wavelength of minimum reflectivity of a sample departs by less than a prescribed tolerance from a standard value in order to establish the suitability of the sample for further processing for an intended end use.

The invention may be more clearly understood by reference to the accompanying drawings.

Figure 2:
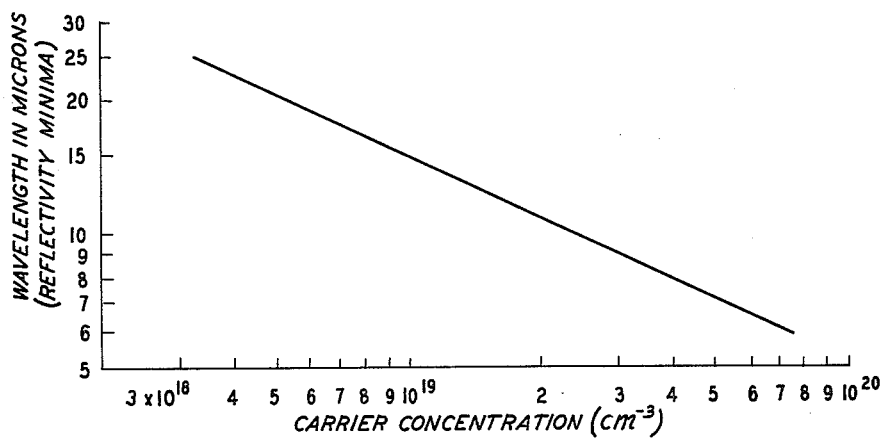
Figure 3:
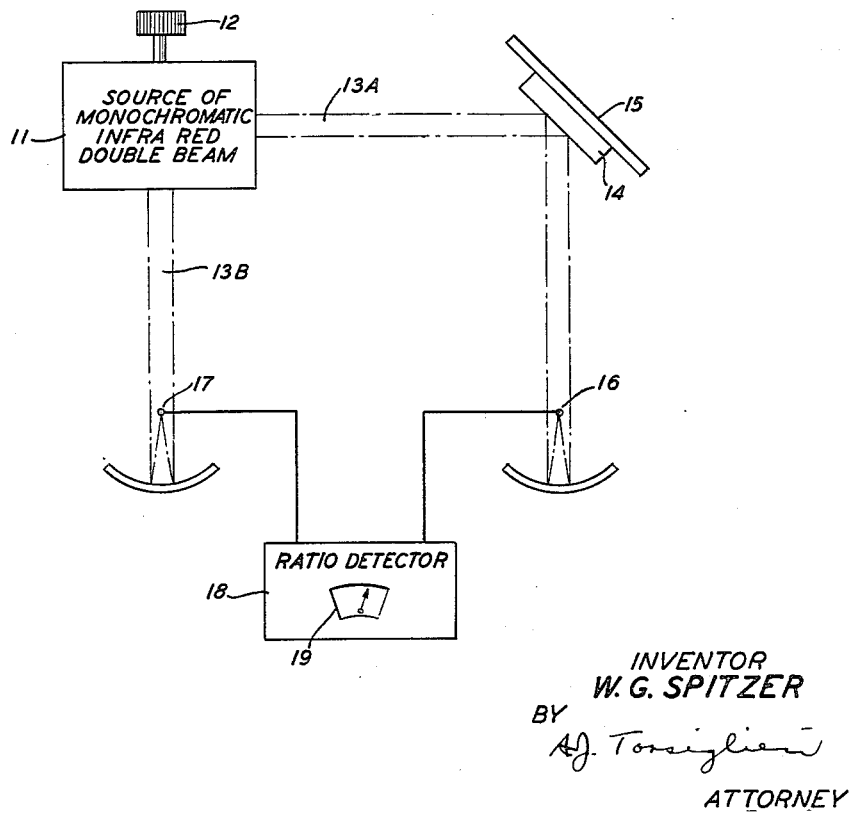

FIGURE 1 shows curves of reflectivity versus wavelength for a series of arsenic concentrations in n-type germanium;

In FIGURE 2 is shown the impurity concentration versus wavelength of minimum reflectivity function for arsenic-doped germanium; and FIGURE 3 is a schematic diagram of typical apparatus suitable for determining the wavelength of minimum reflectivity for the practice of the invention.

The relationships used by the method of the invention are illustrated in FIGURE 1. The variations of reflectivity with wavelength of radiation between two and twenty-five microns is shown, by way of example, for arsenic-doped germanium. Each of the curves 1 through 6 represents the reflectivity of a sample of the indicated concentration of arsenic in germanium as the wavelength of the incident radiation is varied. It can be seen that in each case there is a well defined wavelength at which the reflectivity is a minimum and that the position of the minimum is different for different concentrations. Similar families of curves can be obtained for other combinations of impurities and semiconductors.

In FIGURE 2, there is plotted the function of impurity concentration with the wavelength of minimum reflectivity, which can be derived from a graph of the type shown in FIGURE 1. The abscissa is a logarithmic plot of the impurity concentration and the ordinate is the logarithm of the wavelength of minimum reflectivity. A graph of the kind shown in FIGURE 2 makes possible an immediate determination of the arsenic content in arsenic-doped germanium, once the wavelength of minimum reflectivity is determined.

The determination of the wavelength of minimum reflectivity can readily be made by any of the apparatus customarily used for making infrared reflectivity measurement. Because the intensity of the usual infrared sources varies strongly with wavelength, it is advantageous to utilize a double beam, one of which is directed at the sample and the other of which is used as the standard to compensate for the wavelength dependence of the source in determining the wavelength of minimum reflectivity of the sample.

FIGURE 3 shows schematically typical apparatus for making reflectivity measurements in accordance with the practice of the invention. Basically the apparatus comprises the optical system of a double beam infrared spectrometer of the kind familiar to workers in the art. In the interest of simplicity, and since the specific details are not critical, the optical system has not been shown in detail but has been designated simply as a source 11 of a monochromatic infrared double beam. For example, there can be utilized the optical system of an infrared spectrophotometer of the kind described in the Instrumentation Section of Analytical Chemistry, volume 28, No. 2, February 1956, by R. H. Muller, or of the kind described in the Journal of the Optical Society of America, volume 40, No. 1, pages 29–35, January 1950. As known to workers in the art, such a source comprises a broad band infrared source, such as a Globar, which is used to provide a pair of infrared beams each of which by means of a prism, a Littrow mirror, and an exit slit is converted into a monochromatic beam, the wavelength of the beam being controllable by a control dial which sets the angle of incidence of the beam on the Littrow mirror for fixing the wavelength of the substantially monochromatic radiation passing through the exit slit. The source 11 is shown provided with a control dial 12 for varying the wavelength of the emergent radiation. Typically there is also included a control dial (not shown) for fixing the bandwidth of the emergent beam. For the practice of the invention, a bandwidth of about one percent of the frequency used is satisfactory.

One half 13A of the double beam is directed along a path which includes the sample 14 being tested as a reflecting element. Advantageously, the sample, which typically comprises an elongated ingot as shown, is on a movable mount 15 such that the beam is incident only on a particular narrow zone of the ingot, typically an area of about 5 square millimeters. By movement of the mount in a fixed direction, successive zones of the ingot can be exposed to the beam. The reflected beam is collected by a radiation thermocouple 16 adapted for providing a measure of the incident radiation.

The other half 13B of the beam is made to traverse a path which is the optical equivalent of that traversed by beam 13A except for the omission of reflection from the sample and thereafter it is collected by a radiation thermocouple 17 which has a response characteristic similar to that of thermocouple 16.

The voltages developed by the two thermocouples are then supplied to a ratio detector 18, which is adapted for detecting the ratio of the voltage developed by the thermocouple supplied with the beam reflected by the sample to the voltage developed by the thermocouple supplied with the standard beam. Such circuits are well known in the art. The ratio detector is provided with a meter 19 to provide a visible indication of the resultant.

In operation, the control dial 12 is adjusted for a minimum reading of the meter 19 corresponding to a minimum in the reflectivity of the sample. By appropriately calibrating the control dial in terms of carrier concentration, rather than in wavelength, there can be provided a direct reading of the carrier concentration. Such calibration can be achieved by first identifying the wavelength of minimum reflectivity for a series of known impurity concentrations in the semiconductor material of interest. Known techniques, such as the Hall-type measurements previously mentioned can be utilized originally for determining the impurity concentrations in such material.

Alternatively, there may be provided a series of calibration curves of the kind shown in FIGURE 2, by means of which an operator can translate a wavelength reading on the control dial to a concentration of the impurity in the sample.

For ascertaining the impurity concentration profile along an ingot, successive portions of the ingot are exposed to the active beam by movement of the mount.

It should be obvious that various other arrangements may be devised for converting the setting of wavelength dial control 12 for minimum deflectivity to the value of the corresponding impurity concentration. In particular, a potentiometer can be coupled to the dial control so that each setting of the dial control corresponds to a characteristic potentiometer setting. The setting of the potentiometer is used to fix the current which flows through a meter which has a scale calibrated to provide a reading of impurity concentration corresponding to the potentiometer setting. By having a number of meter scales, one for each combination of semiconductor and impurity of interest, the impurity concentrations of a wide variety of semiconductive materials can be determined with the described equipment merely by affixing the appropriate meter scale to the meter.

Similarly, it can be appreciated that the technique described can be readily adapted to check the impurity concentration profile of an ingot without regard to the absolute value of the concentration. In many instances, for example in production control, it is important to ascertain only that the uniformity of the impurity concentration along an ingot is within prescribed tolerances. In such an instance, it is sufficient to measure the wavelength of minimum reflectivity along successive portions of the ingot merely to ascertain the degree of variation of such wavelength to provide a measure of the uniformity of the impurity concentration along the ingot.

Moreover, based on the principles set forth, production control techniques can be devised for rejecting samples whose wavelength of minimum reflectivity by more than a prescribed tolerance departs from a standard wavelength without regard to a determination of the absolute value of carrier concentration of a given sample.

It is to be understood that still other modes of operation can be developed by one skilled in the art without departing from the spirit and scope of the invention. Such flexibility in the mode of operation is one of the advantages of the invention.

What is claimed is:

1. The method for determining the concentration of the predominant conductivity-type determining impurity in a semiconductive sample comprising first measuring the dependence of wavelength of minimum reflectivity to infrared radiation with concentration of the predominant impurity in semiconductor material of known concentration and then measuring the wavelength of minimum reflectivity in a test sample to determine the concentration in the test sample.

2. The method for determining the profile of the concentration of the predominant conductivity-type determining impurity in a semiconductive ingot comprising the steps of measuring the reflectivity of each of a succession of zones of said ingot to infrared radiation at a plurality of different infrared wavelengths for locating the wavelength at which the reflectivity is a minimum, and converting said wavelength of minimum reflectivity thus obtained into a value of impurity concentration by comparing said wavelength to wavelengths of minimum reflectivity for ingots of known impurity concentrations.

References Cited in the file of this patent

UNITED STATES PATENTS

| | | |
|---|---|---|
| 2,856,531 | Brouwer | Oct. 14, 1958 |
| 2,920,205 | Choyke | Jan. 5, 1960 |
| 2,977,477 | Rosi et al. | Mar. 28, 1961 |

OTHER REFERENCES

Optical Absorption by Degenerate Germanium, by J. I. Pankove from Physical Review Letters, vol. 4, No. 9, May 1, 1960, pages 454 and 455.